Yoshiaki Ameyama
Akira Takeda
INVENTORS

Yoshiaki Ameyama
Akira Takeda,
INVENTORS

BY Wenderoth,
Lind and Ponack,
Attorneys

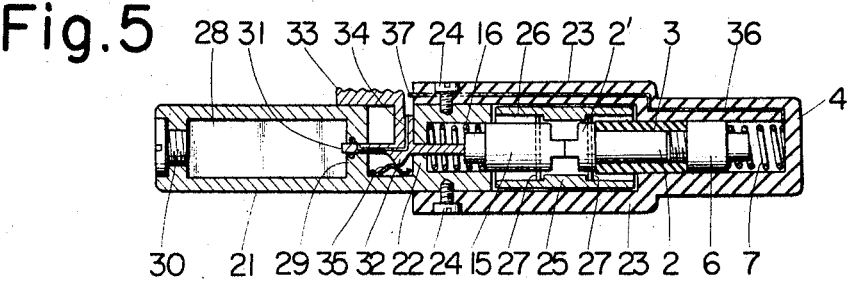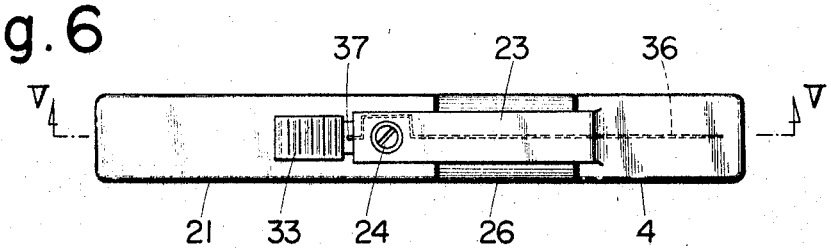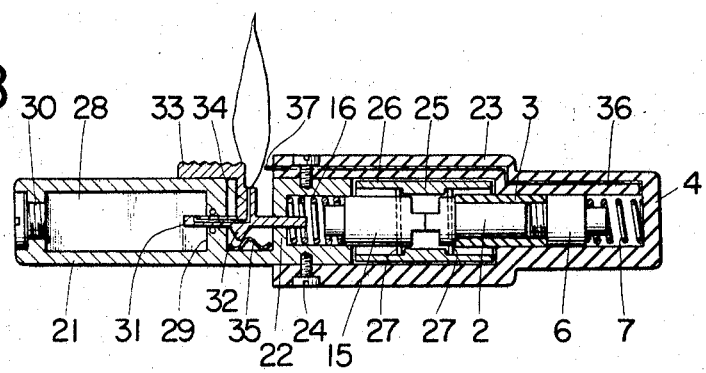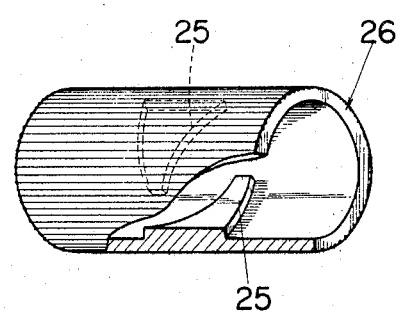

United States Patent Office 3,428,408
Patented Feb. 18, 1969

3,428,408
IMPACT TYPE OF PIEZOELECTRIC MECHANISM BY WAY OF AN ELECTRIC SOURCE FOR LIGHTING
Yoshiaki Ameyama and Akira Takeda, Tokyo, Japan, assignors to Kanto Gasukigu Kabushiki Kaisha, Tokyo, Japan
Filed Dec. 6, 1966, Ser. No. 599,553
Claims priority, application Japan, Dec. 9, 1965, 40/75,305, 40/75,308; Dec. 28, 1965, 40/80,351
U.S. Cl. 431—255                            12 Claims
Int. Cl. F23g 7/12, 3/00, 13/00

ABSTRACT OF THE DISCLOSURE

An impact type piezoelectric mechanism for use as a source of electricity for lighting a gaseous fuel. At least the piezoelectric element is movable away from an impact body against a spring means, and is released so as to be driven against the impact body to create a flow of current across spaced electrodes. The impact body can also be movable away from the piezoelectric element also against spring means so that both elements are driven toward each other to impact when they are released.

---

The present invention relates to an impact type piezoelectric mechanism for use as a source of electric current for use in ignition of a gaseous fuel, and more particularly to a piezoelectric mechanism adapted to generate electricity by being acted on by an impact force for lighting various gas appliances such as gas stoves, gas heated steam tables, gas heaters and the like, or gas lighters.

A substance having a piezoelectric effect (a so-called piezoelectric element) can be acted upon with an impact force for generating electricity, which is used as an electric source for lighting gas as is well known. However, such an impact type piezoelectric mechanism is usually of a type wherein a piezoelectric element is fixed on a stationary member and said piezoelectric element is struck with a hammer. Since the stationary element is required to have a large mass in this case, a metallic substance which has a high electric conductivity should be used. For this purpose, two piezoelectric elements are used, in which two plus sides are butted against each other to prevent leakage due to high voltage. Or alternatively, a special insulating means is necessary between the piezoelectric element and the fixed substance.

Thus, conventional piezoelectric mechanisms are not only restricted by the necessity of providing the special piezoelectric element, but also both the impact mechanism such as, for instance, a hammer or the like on one hand and the fixed mass on the other are needed. Therefore, the amount that the size of the piezoelectric mechanism can be reduced is limited, and the price becomes disadvantageously high.

The principal object of the present invention is to provide an impact type piezoelectric mechanism for providing an electric source for lighting, which is free from the disadvantages of the conventional piezoelectric mechanism referred to above, and has a small size and low cost.

Another object of the present invention is to simplify and reduce the weight of the mechanism by making unnecessary either the striking member, for instance, a hammer, or the fixed mass, which have usually been required.

A further object of the present invention is to generate all the electric power needed, although the device is small and light in weight.

A still further object of the present invention is to ensure that the piezoelectric mechanism can be integrated with a portable gas lighter by reducing the size and weight.

In the following the present invention is described in detail in reference with the accompanying drawings, in which:

FIG. 5 is a longitudinal sectional side view taken on line V—V of FIG. 6 of another embodiment of the invention as applied to a portable gas lighter;

FIG. 6 is a plan view of FIG. 5;

FIG. 7 is a perspective view of the cam cylinder shown in FIG. 5 with a part thereof cut away; and FIG. 8 is a view similar to FIG. 5 showing the parts in their operative positions.

Figure 1:
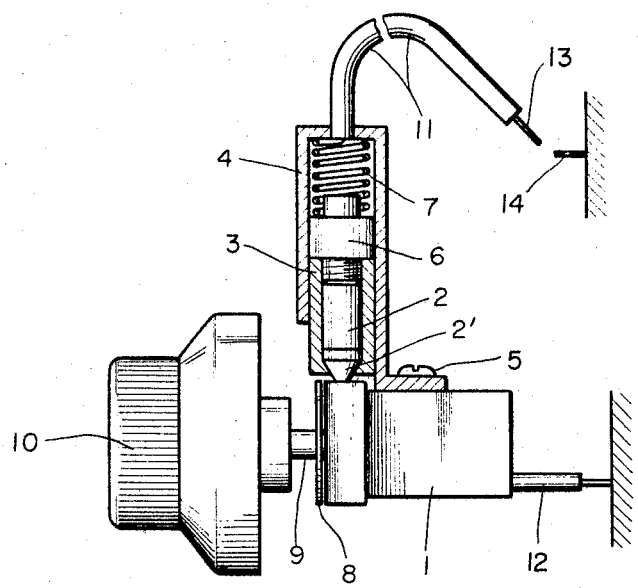
FIG. 1 is a partially sectional front view of the device according to the present invention illustrating an example wherein the present invention is used as an electric source of lighting a gas appliance.
Figure 2:
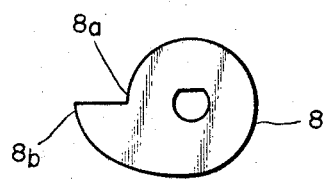
FIG. 2 is a front view of a cam used in the device of FIG. 1.

FIGS. 1 and 2 show an example of the present invention applied to an electric source for lighting a gas appliance. A gas valve body 1 and a piezoelectric element 2 are provided. The outer peripheral wall of the piezoelectric element 2 is covered with an insulating protecting case 3 of plastic or the like, excepting the front end of head 2'. A guide cylinder 4 of an insulating material is secured to the main gas valve body 1 by a stop screw 5 or the like. The head 2' of said piezoelectric element is arranged opposite the main gas valve body 1 and the piezoelectric element 2 covered with said insulated protecting case is slidably mounted in said body 1. An auxiliary metal mass 6 is fixed on said piezoelectric element, which is added when the mass of the piezoelectric element itself is not enough to generate the necessary amount of electric energy. The compressive spring 7 brings the piezoelectric element 2 into contact with the main valve body and simultaneously connects electrically with the plus side of the element 2 through the auxiliary mass 6 to function as an electric conductor. Cam 8 is mounted on a plug shaft 9 for the gas valve by a key. The radius of the cam increases gradually as shown in FIG. 2 from the shortest radius portion 8a to the longest radius portion 8b and falls rapidly from there to the shortest radius portion 8a. The cam shaped as referred to above is placed directly below said insulated protecting case 4. A knob 10 is secured to the plug shaft, and a lead wire 11 is connected to the plus side of the piezoelectric element through said auxiliary mass 6 and spring 7. A lead wire 12 is connected between the main valve body 1 and ground and sparking electrodes 13 and 14, the one on lead wire 11 and the other on ground, are spaced at an appropriate distance.

In the example referred to above, when knob 10 is turned, insulated protecting case 3 will be raised, and accordingly, simultaneously therewith the piezoelectric element 2, and auxiliary mass 6 will be pushed up, and when they have been raised the maximum distance, the longest radius portion of cam 8b will rotate out from under the lower end of insulated protecting case 3 and the head 2' of piezoelectric element will strike against the main valve body 1 by virtue of the returning force of said spring, enabling the spark discharge to take place between the electrodes 13 and 14.

Thus, in the present invention, since the piezoelectric element by itself or with the auxiliary mass is moved away from the fixed mass against the action of the spring and the piezoelectric element itself strikes the fixed mass by virtue of returning force of the said spring, a hammer for striking the piezoelectric element is not required as in prior art devices. Moreover, since the plus side of the piezoelectric element is in the inside of the guide cylinder, leakage of electric power can be avoided by using only one piezoelectric element by a simple means, for instance, that the guide cylinder is made of insulating material. Thereby, a smaller, lighter and yet low cost impact type piezoelectric mechanism can be obtained.

Further, in the said example of an embodiment of the present invention, the main valve body simultaneously also serves as a fixed mass as shown. However, the present invention is by no means restricted to such an example.

Figure 3:
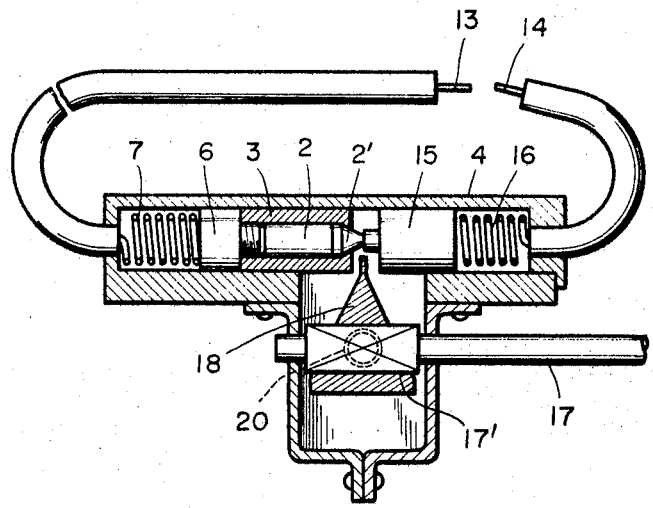
FIG. 3 is a sectional view of another example of the embodiment of the present invention.
Figure 4:
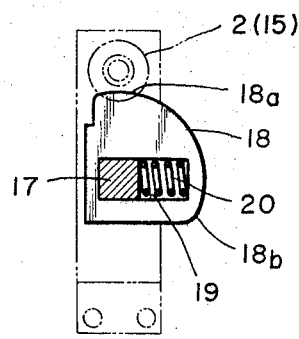
FIG. 4 is a front view of the cam used in FIG. 3.

FIGS. 3 and 4 are fundamentally similar to the example described above, but both the piezoelectric element and impact body against which said element strikes are moved away from one another and thereafter the above two members are adapted to collide with each other, so that a smaller and lighter device can be obtained as compared with the above described example.

Namely, in FIGS. 3 and 4, a piezoelectric element 2 has a head 2′ and is positioned in an insulated protecting case 3 and slidable within a guide cylinder 4 of insulating material. An auxiliary mass 6 is mounted on the end of element 2 and a compressive spring 7 urges mass 6 and element 2 to the right in the figure and functions as a lead wire. The construction of these elements is similar to the example described above. In this example, the impact body 15, against which the piezoelectric element strikes, is slidably mounted in the guiding cylinder 4, and a further compression spring 16 is provided in back of impact body 15, and both the piezoelectric element and impact body are separated by revolving cam 18 mounted on the shaft 17 against the force of springs 7 and 16 and then the two members strike against each other under the action of the returning force of springs 7 and 16. For this purpose, the front end of impact body 15 has an extension at the center of said end, and cam 18 has the shape of approximately a quarter circle. It has one end 18a narrow enough to enter the space between the piezoelectric element and the impact body, and the thickness increases toward the other end 18b. A rectangular hole 19 is provided in the cam, in which a square shaft portion 17′ formed on one portion of shaft 17 is inserted and simultaneously when cam 18 is revolved in the direction for separating the piezoelectric element and the impact body, with the square shaft portion 17′ is pushed to one end of the rectangular hole 19 by a spring 20, the action takes place as mentioned above. However, if the broader portion of cam 18 strikes the piezoelectric element and impact body when the shaft 17 is revolved in the opposite direction, cam 18 is moved against the action of compressing spring 20 and can be returned to the original position without disturbance.

According to the said example, a smaller and lighter piezoelectric mechanism can be obtained, because of the factors relating to generation of electric energy being increased in comparison with conventional devices, wherein a piezoelectric element is fixed and struck with a hammer, as compared with the present device wherein, as shown in FIGS. 1 and 2, only the piezoelectric element is caused to impinge against a fixed mass.

Namely, when in conventional devices the piezoelectric element is fixed and is struck with a hammer, the factors relating to the generation of predetermined electric energy are only three, i.e. mass of the hammer, velocity of the hammer when it strikes and the mass of the piezoelectric element, and the two predetermined factors, the shape and material of the piezoelectric element. However, in this example both the piezoelectric element and the impact body are moved against one another, and the velocity of the piezoelectric element is added. This is shown by the numerical formula by way of an elastic stress energy at impingement as in the following.
Assuming that:

Mass of an impact body (hammer)$=\overline{m}$

Velocity of an impact body (hammer) at impingement$=\overline{u}$

Mass of piezoelectric element$=m$ and

Velocity of piezoelectric element$=u$

The elastic strain energy $= \frac{1}{2}(\overline{u}-u)^2 \cdot \frac{m \cdot \overline{m}}{m+\overline{m}}$ Since in the conventional piezoelectric mechanism $u=0$, $$\frac{\overline{u}^2}{2} \cdot \frac{m \cdot \overline{m}}{m+\overline{m}}$$

In the present example, assuming $\overline{u}=u$, $$2\overline{u}^2 \cdot \frac{m \cdot \overline{m}}{m+\overline{m}}$$

Therefore, in the present example, when other factors are entirely identical, an electric energy 4 times that of a conventional device can be generated by moving both the piezoelectric element and the hammer. In fact, as such an increase is not needed, the impact body and mass of the piezoelectric element can be made correspondingly small and light.

FIGS. 5 to 8 show an example wherein a piezoelectric ignition device shown in said FIG. 3 and FIG. 4 is incorporated in a gas-lighter.

In FIGS. 5 to 8, a piezoelectric element 2 has a head 2′ and is positioned in an insulated protecting case 3. An auxiliary mass 6 is secured to the rear end of said piezoelectric element whenever necessary, and 15 denotes an impact body. Those members referred to above are accommodated slidably along the same axial line in a guiding cylinder 4 of insulating material and a chamber divided by parting wall 22 from metal cylinder 21, both of which are arranged on the same axial line. A spring 7 is positioned between the inner end wall of said guiding cylinder 4 and auxiliary mass 6, and a spring 16 is arranged between the parting wall 22 of metal cylinder 21 and impact body 15 respectively. When the two members are separated and then released, the piezoelectric member 2 collides with impact body 15.

The said guiding cylinder 4 has the right end closed as illustrated and a cam cylinder 26 of insulating material is positioned between the left end of cylinder 4 and metal cylinder 1 and is rotatable within a bifurcated portion 23 integral at one end with cylinder 4 and attached by screws 24 at the other end to metal cylinder 21. The construction has the guiding cylinder, cam cylinder 26 and metal cylinder 21 arranged in the same axial line like one cylinder, in which piezoelectric element 2, impact body 15, springs 7 and 16 or others are accommodated.

On the inner periphery of cam cylinder 26, cam projections 25 are symmetrically formed, the widths of which gradually increase from one end to the other as shown in FIG. 7, and pins 27 portrude diametrically from portions near the front ends of piezoelectric element 2 and impact body 15 respectively. The cam projection 25 of said cam cylinder is designed to move between pins 27. Thus, if the cam cylinder 26 is revolved, the space between the pins 27 will be increased by cam projection 25 moving the element 2 and body against springs 7 and 16. Accordingly, the piezoelectric element 1 is moved away from the impact body 15. The two members collide with each other under the action of the returning force of springs 7 and 16, when the wide portion of cam projection 25 moves past the pins 27. Further, the said cam cylinder is knurled on the outer surface thereof as illustrated in FIG. 6 so that the cylinder can easily be revolved, for instance, with a tip of the finger.

A tank 28 for liquefied gas has a parting wall 29 on one end. At the other end is a gas pouring inlet 30 equipped with any suitable valve. A valve rod 31 extends through said parting walls 22 and 29. Said valve rod has convex projections 32 and a finger-rest 33 for moving the valve, and a bore 34 is formed from the front of the finger-rest inside the valve rod so as to communicate with the inside of the gas tank when the valve rod is in the leftmost position. A convex spring 35 is positioned in cylinder 21 for maintaining valve rod 31 at a set position, and resiliently contacts with one side of said convex projection 32. When the said impact body 15 is moved back against spring 16, the valve rod 31 is pushed inside gas tank 28 by the rear end of impact body 15 in order to place bore 34 in communication with the interior of the gas tank, and at the same time the convex projection 32 of valve rod 31 comes into contact with the reverse side of the convex spring 35. This holds the end of bore 34 inside tank 28. Projection 32 is moved to the other side of spring 35 by pushing the finger-rest 33 with the tip of a finger. A lead wire 36 is connected with the spring 7 at one end thereof and serves as a conductor, and, as shown in FIG. 5, passes through guiding cylinder 4 of insulating material and the insulating material of bifurcated portion 23 to an electrode 37 at the front end thereof, which projects opposite said finger-rest 33, spark discharge being caused to occur between the electrode 37 and finger-rest 33.

In the embodiment described above, since the piezoelectric mechanism is composed as described, if the cam cylinder 26 is revolved, for instance, by fingers, the piezoelectric element 2 is separated from impact body 15 by cam projection 25 as described above, the valve rod 31 is pushed into gas tank 28 by retraction of the impact body in order to eject gas from the front end of nozzle hole 34, and in the next instant, the piezoelectric element 2 collides with the impact body to cause a spark discharge between the finger rest 33 for returning the valve and electrode 37, and igniting the gas ejected from bore 34.

What is claimed:

1. An impact type piezoelectric mechanism for use as a source of electricity for igniting a gaseous fuel, comprising a movable piezoelectric element, a fixed impact body, means for elastically biasing said piezoelectric element toward and against the impact body, means engaging the piezoelectric element for moving the piezoelectric element away from the impact body against said biasing means and then releasing said element, and spaced electrodes coupled to said piezoelectric element and said impact body, whereby the said piezoelectric element is first separated from said impact body by said means for moving said body and element away from each other and then released from said moving means and the piezoelectric element is caused to collide with the impact body to cause a discharge across said electrodes.

2. An impact type piezoelectric mechanism as claimed in claim 1 further comprising an auxiliary mass on said piezoelectric element.

3. An impact type piezoelectric mechanism as claimed in claim 1 wherein said biasing means between the piezoelectric element and impact body is a spring, and said means for moving said piezoelectric element away is a cam engaging said piezoelectric element for moving it against the spring, and the piezoelectric member is caused to collide with the impact body by the returning force of the spring.

4. An impact type piezoelectric mechanism comprising a guiding cylinder of insulating material, a compression spring, a piezoelectric element having the outer periphery covered with an insulated protecting case, said spring and piezoelectric element being slidably positioned in said guiding cylinder, a fixed impact body contacted by said guiding cylinder, and a cam energizing said piezoelectric element for first moving said element away from the fixed impact body against the action of said spring and then releasing it to cause it to collide with the fixed impact body.

5. An impact type piezoelecrtic mechanism as claimed in claim 4 wherein said spring is in electrical contact with said piezoelectric element and acts as a conductor.

6. An impact type piezoelectric mechanism as claimed in claim 4 in which said impact body is a main gas valve body of a gas appliance and said mechanism further includes spaced electrodes coupled to said piezoelectric element and to said impact body and across which a discharge occurs on collision of said piezoelectric element with said impact body.

7. An impact type piezoelectric mechanism, comprising a piezoelectric element, an impact body, means elastically engaging said piezoelectric element and said impact body and biasing them toward one another respectively, means engageable with said piezoelectric element and said impact body for moving the piezoelectric element and the impact body away from one another respectively against the elastically biasing means, and then releasing the piezoelectric element and the impact body, whereby they collide with one another under the return forces of said biasing means.

8. An impact type piezoelectric mechanism as claimed in claim 7 wherein the outer periphery of said piezoelectric element is covered with an insulating protecting case and a common guiding cylinder of insulating material in which said piezoelectric element and said impact body are slidably mounted, said biasing means are springs and said means for moving the piezoelectric element and the impact body away from each other is a cam interposed between said piezoelectric element and said impact body.

9. An impact type piezoelectric mechanism as claimed in claim 8 wherein said cam has a long rectangular hole therein and a square shaft for rotating the cam is slidably positioned in said rectangular hole, and a spring in said hole biasing said square shaft to one end of said rectangular hole, whereby when the cam strikes the piezoelectric element and impact body on the return rotation of the cam, the spring in the rectangular hole is compressed for retracting the cam.

10. A gas lighter comprising a cylinder, a piezoelectric element and an impact body slidably mounted within said cylinder with elastic biasing means engaging at least said piezoelectric element and biasing it toward said impact body, means for moving at least said piezoelectric element away from said impact body against the action of said biasing means and releasing it to cause it to impact the impact body, a fuel gas supply and a valved conduit from said supply opening out of said lighter, and spaced electrodes adjacent the valved conduit where it opens out of said lighter and coupled to said impact body and said piezoelectric element, said valved conduit being opened when said piezoelectric element is moved away from said impact body and a discharge then being caused across said spaced electrodes as gas is flowing from said conduit when said piezoelectric element impacts said impact element.

11. A gas lighter as claimed in claim 10 in which elastic biasing means are provided in back of said impact body biasing said impact body toward said piezoelectric element, and said means for moving said piezoelectric element away from said impact body moves said impact body away from said piezoelectric element at the same time, and one of said movable members engages said valved conduit for moving it for opening said conduit when said moving means moves said element and said impact body away from each other.

12. A gas lighter, comprising a guiding cylinder of insulating material, a rotatable cam cylinder aligned with said guiding cylinder, said cam cylinder having projections on the inner surface thereof, and a metal cylinder aligned with said guiding cylinder and cam cylinder, a piezoelectric element slidably mounted in said guiding cylinder and spring means in said guiding cylinder biasing said element toward said cam cylinder, an impact body slidably mounted in said metal cylinder and spring means in said metal cylinder biasing said impact body toward said cam cylinder, pins extending through the ends of said element and said impact body adjacent said cam cylinder and engageable with the projections on said cam cylinder for movement of said impact body and piezoelectric element away from each other when said cam cylinder is rotated, a gas tank attached to the other end of said metal cylinder, a valve of conductive material extending into said gas tank and into said metal cylinder and engaged with said impact body, said valve rod having a gas conduit therethrough which opens into said gas tank when said impact body is in a position remote from said piezoelectric element, said valve rod having said conduit opening out of the rod, and a finger rest of conductive material on said valve rod for moving said rod, said guiding cylinder having an extension with an electrode therein coupled to said spring and projecting to a position spaced from said finger rest, whereby on rotation of the cam cylinder the impact body and piezoelectric element are separated from each other and the valve body is moved to open the conduit to the gas tank, and then the impact body and piezoelectric element are released and impact with each other to produce a discharge across the electrode and the finger rest to ignite fuel from the gas tank.

References Cited

UNITED STATES PATENTS 3,200,295    8/1965    Owens et al. _____ 317—83

FOREIGN PATENTS 606,498    10/1960    Canada.

FREDERICK KETTERER, *Primary Examiner.*

U.S. Cl. X.R.

310—8.7; 317—81